United States Patent
Horesh et al.

(10) Patent No.: US 11,169,979 B2
(45) Date of Patent: Nov. 9, 2021

(54) DATABASE-DOCUMENTATION PROPAGATION VIA TEMPORAL LOG BACKTRACKING

(71) Applicant: INTUIT INC., Mountain View, CA (US)

(72) Inventors: Yair Horesh, Hod Hasharon (IL); Sheer Dangoor, Hod Hasharon (IL); Yehezkel Shraga Resheff, Hod Hasharon (IL); Yaron Moshe, Hod Hasharon (IL)

(73) Assignee: INTUIT, INC., Mountain View, CA (US)

( * ) Notice: Subject to any disclaimer, the term of this patent is extended or adjusted under 35 U.S.C. 154(b) by 32 days.

(21) Appl. No.: 16/731,399

(22) Filed: Dec. 31, 2019

(65) Prior Publication Data

US 2021/0200728 A1   Jul. 1, 2021

(51) Int. Cl.
| | | |
|---|---|---|
| *G06F 16/00* | (2019.01) | |
| *G06F 16/21* | (2019.01) | |
| *G06F 16/245* | (2019.01) | |
| *G06F 16/22* | (2019.01) | |
| *G06F 16/901* | (2019.01) | |

(52) U.S. Cl.
CPC ........ *G06F 16/217* (2019.01); *G06F 16/2282* (2019.01); *G06F 16/245* (2019.01); *G06F 16/9024* (2019.01)

(58) Field of Classification Search
CPC .............. G06F 16/217; G06F 16/9024; G06F 16/2282; G06F 16/245
USPC ........................................................ 707/694
See application file for complete search history.

(56) References Cited

U.S. PATENT DOCUMENTS

| | | | | |
|---|---|---|---|---|
| 6,006,225 | A  * | 12/1999 | Bowman | G06F 16/3325 |
| 7,627,559 | B2 * | 12/2009 | Srivastava | G06Q 30/02 |
| 8,190,546 | B2 * | 5/2012 | Dong | G06N 7/005 |
| | | | | 706/45 |
| 9,378,303 | B1 * | 6/2016 | Shankar | G06F 16/9024 |
| 2007/0192306 | A1 * | 8/2007 | Papakonstantinou | ........................ |
| | | | | G06F 16/951 |
| 2007/0208693 | A1 * | 9/2007 | Chang | G06F 16/9024 |
| 2008/0082644 | A1 * | 4/2008 | Isard | H04L 67/1097 |
| | | | | 709/223 |
| 2009/0138686 | A1 * | 5/2009 | Gruetzner | G06F 16/9024 |
| | | | | 712/220 |

(Continued)

*Primary Examiner* — Thanh-Ha Dang
(74) *Attorney, Agent, or Firm* — Patterson + Sheridan, LLP

(57) ABSTRACT

Aspects of the present disclosure provide techniques for database documentation propagation. Embodiments include scanning a log comprising a plurality of database queries to identify one or more database queries of the plurality of database queries, the one or more database queries being associated with generating a new table of a database based on information in an existing table of the database. Embodiments include generating, based on the one or more database queries identified during the scanning, a directed acyclic graph (DAG) comprising: a first vertex representing the existing table; a second vertex representing the new table; and a directed edge connecting the first vertex to the second vertex. Embodiments include obtaining documentation associated with the existing table. Embodiments include propagating, based on the DAG, at least a subset of the documentation associated with the existing table to the new table.

20 Claims, 6 Drawing Sheets

(56) References Cited

U.S. PATENT DOCUMENTS

| | | | |
|---|---|---|---|
| 2009/0240649 A1* | 9/2009 | Sereni | G06F 16/2425 |
| | | | 706/54 |
| 2009/0240682 A1* | 9/2009 | Balmin | G06F 16/248 |
| 2014/0013318 A1* | 1/2014 | Rychikhin | G06F 8/71 |
| | | | 717/172 |
| 2014/0172914 A1* | 6/2014 | Elnikety | G06F 16/9024 |
| | | | 707/774 |
| 2015/0026158 A1* | 1/2015 | Jin | G06F 16/90335 |
| | | | 707/722 |
| 2015/0120775 A1* | 4/2015 | Shao | G06F 16/2456 |
| | | | 707/769 |
| 2015/0127677 A1* | 5/2015 | Wang | G06F 16/245 |
| | | | 707/769 |
| 2015/0134637 A1* | 5/2015 | Pall | G06F 16/9024 |
| | | | 707/718 |
| 2015/0302300 A1* | 10/2015 | Fletcher | G06N 5/04 |
| | | | 706/11 |
| 2015/0317387 A1* | 11/2015 | Heenan | G06F 16/9024 |
| | | | 707/723 |
| 2015/0341167 A1* | 11/2015 | Gregory | G06F 16/9024 |
| | | | 380/281 |
| 2017/0147709 A1* | 5/2017 | Ganz | G06F 16/9027 |
| 2017/0364701 A1* | 12/2017 | Struttmann | G06F 16/2282 |
| 2018/0181676 A1* | 6/2018 | Khandelwal | G06F 16/90335 |
| 2019/0205385 A1* | 7/2019 | Gusakov | G06F 40/253 |
| 2019/0318117 A1* | 10/2019 | Beecham | G06F 16/9024 |
| 2019/0318437 A1* | 10/2019 | Lee | G06F 16/9024 |
| 2019/0339966 A1* | 11/2019 | Moondhra | G06F 8/433 |

* cited by examiner

DATABASE-DOCUMENTATION PROPAGATION VIA TEMPORAL LOG BACKTRACKING

INTRODUCTION

Aspects of the present disclosure relate to techniques for propagating database documentation based on database query logs.

BACKGROUND

Software applications often utilize databases for storage of information, and these databases are generally associated with documentation. Documentation of a database generally includes descriptions of columns and tables, naming conventions, and the like. In some cases, documentation is added by software developers or administrators as each table is created, and is associated with the database as metadata.

Databases of software applications may be updated and modified on a continuous basis. For example, a database that stores information accessible to users of an application may be frequently updated in order to match application updates and user needs. In some cases, tables may be added and dropped, and schemas may be changed over time.

Due to these frequent changes, it can be challenging to ensure that databases are maintain adequate and up-to-date documentation.

BRIEF SUMMARY

Certain embodiments provide a method. The method generally includes: scanning a log comprising a plurality of database queries to identify one or more database queries of the plurality of database queries, the one or more database queries being associated with generating a new table of a database based on information in an existing table of the database; generating, based on the one or more database queries identified during the scanning, a directed acyclic graph (DAG) comprising: a first vertex representing the existing table; a second vertex representing the new table; and a directed edge connecting the first vertex to the second vertex, indicating that the new table was created based on the existing table; obtaining documentation associated with the existing table; and propagating, based on the DAG, at least a subset of the documentation associated with the existing table to the new table.

Other embodiments provide a method. The method generally includes: scanning, by a computing device, a log comprising a plurality of database queries to identify a subset of the plurality of database queries, wherein each respective database query in the subset is one of: a create table query; a load table query; an insert query; or an update table query; identifying, by the computing device, a database query in the subset, the database query being associated with generating a new table of a database based on information in an existing table of the database; generating, by the computing device, based on the database query, a directed acyclic graph (DAG) comprising: a first vertex representing the existing table; a second vertex representing the new table; and a directed edge connecting the first vertex to the second vertex, indicating that the new table was created based on the existing table; traversing, by the computing device, the DAG to identify a relationship between the new table and the existing table based on the directed edge; determining, by the computing device, that the relationship involves copying an entirety of a column of the existing table to the new table; obtaining, by the computing device, documentation associated with the column of the existing table; and propagating, by the computing device, the documentation to the new table by adding the documentation as metadata of the new table.

Other embodiments provide a system comprising one or more processors and a non-transitory computer-readable medium comprising instructions that, when executed by the one or more processors, cause the system to perform a method. The method generally includes: scanning a log comprising a plurality of database queries to identify one or more database queries of the plurality of database queries, the one or more database queries being associated with generating a new table of a database based on information in an existing table of the database; generating, based on the one or more database queries identified during the scanning, a directed acyclic graph (DAG) comprising: a first vertex representing the existing table; a second vertex representing the new table; and a directed edge connecting the first vertex to the second vertex, indicating that the new table was created based on the existing table; obtaining documentation associated with the existing table; and propagating, based on the DAG, at least a subset of the documentation associated with the existing table to the new table.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
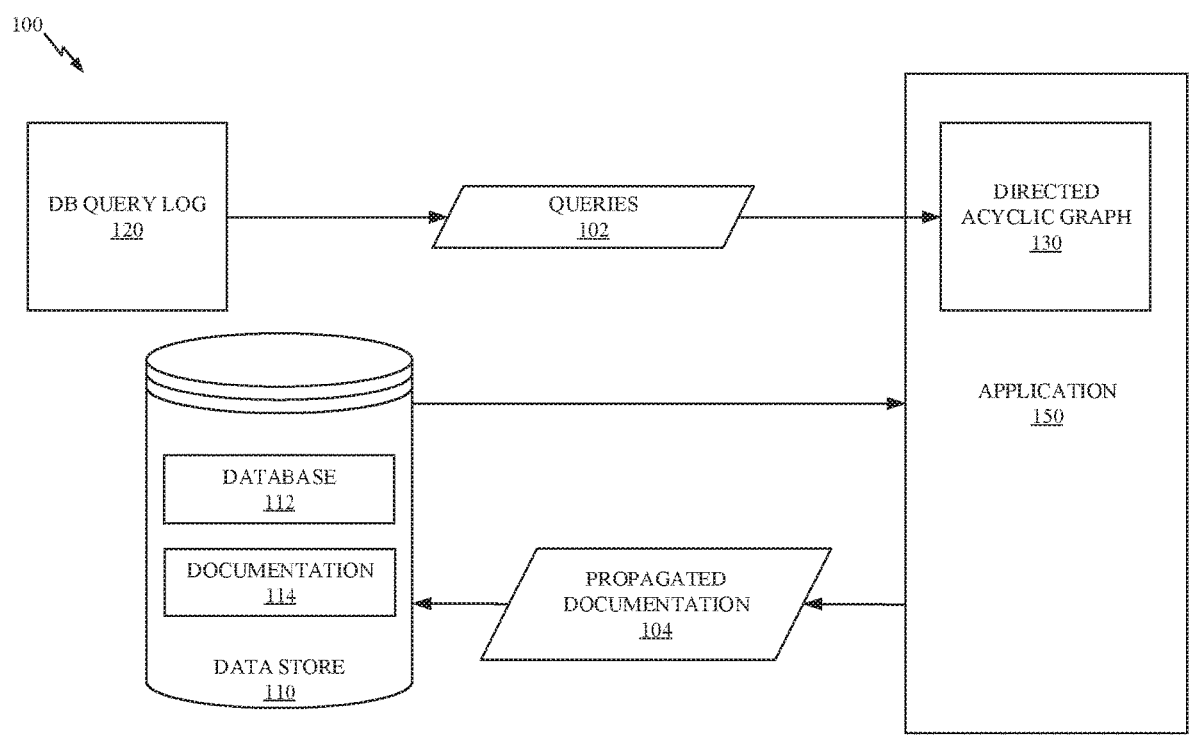
FIG. 1 depicts an example of database documentation propagation based on query logs.

Aspects of the present disclosure provide apparatuses, methods, processing systems, and computer readable mediums for database documentation propagation based on query logs.

Embodiments of the present disclosure involve using entries in a database query log to generate a directed acyclic graph (DAG) for use in propagating database documentation. Database servers generally maintain a log of all queries submitted to the database, including attributes such as user, execution date and time, and result set size for the queries. In an example, a log of queries submitted to a database, such as a database including application data and user data associated with an application, is scanned to identify a set of queries that relate to creating and updating tables. In one example all create table, load table, insert, and update table queries in the log are identified. The set of queries may, in some embodiments, be sorted based on execution time. A DAG is then generated based on the queries. Each given query that creates or loads a table without reference to an existing table is represented by a vertex in the DAG that includes the attributes of the given query. Each given query that involves existing tables, such as queries that create new tables based on data in existing tables, is represented by a vertex in the DAG with an edge connected to vertices representing the existing tables involved in the given query. The edges include information specifying relationships between vertices. In some embodiments, vertices that have no input (e.g., vertices representing queries that create new tables without reference to existing tables) are connected to a head vertex that serves as the root of the DAG.

In some embodiments, the DAG is traversed, such as using a breadth-first search (BFS), in order to propagate documentation through the edges of the DAG. For instance, if an edge between a first vertex and a second vertex indicates that a given column of a first table represented by the first vertex was copied to a second table represented by the second vertex, then documentation for the given column that is associated with the first table (e.g., as metadata) is copied to the second table. If there is no documentation for the given column associated with the first table, then a notification may be provided, such as to a database administrator, to provide documentation for the given column.

In some cases, more complex queries also require generating notifications to provide documentation. For example, if an edge between a first vertex and a second vertex indicates that a filter was applied to a first table represented by the first vertex in order to populate a second table represented by the second vertex, then a notification may generated requested documentation for the second table. This is because any existing documentation associated with the first table would not apply directly to the second table, which only includes a subset of the first table (in this example, a filtered subset).

Techniques described herein allow for documentation to be automatically propagated between tables of a database where possible and, in other cases, allow needed documentation to be automatically identified and requested. Accordingly, embodiments of the present disclosure improve databases and software applications to which they relate by automatically ensuring comprehensive database documentation. Certain embodiments address additional technical problems present in conventional database documentation techniques, such as an inability to automatically determine relationships among database documentation. Techniques described herein solve this technical problem by using a DAG created based on database query logs to identify relationships among database tables and propagate documentation between related tables.

Database Documentation Propagation Based on Query Logs

FIG. 1 illustrates an example 100 of database documentation propagation based on query logs.

In example 100, queries 102 are identified from a database query log 120. Database query log 120 generally represents a log maintained by a database server that includes all queries issued to database 112. In some embodiments, database query log 120 includes, for each given query, an identifier of a user that submitted the query, a query execution date and time, a result-set size, and the like for the given query. For instance, database query log 120 may be updated as queries are received by a database server associated with database 112.

A software application 150 scans database query log 120 in order to identify queries 102 for use in generating directed acyclic graph (DAG) 130. In one example, queries 102 include all create table, load table, insert, and update table queries from database query log 120.

In some embodiments, software application 150 generates DAG 130 by sorting queries 102 based on execution time and creating vertices and edges of DAG 130 based on queries 102. In one embodiment, queries that create or load tables without reference to existing tables are represented by vertices, and queries that create, load, insert, or update tables based on existing tables are represented by vertices that have edges connected to other vertices representing the existing tables, indicating that the existing tables are inputs to the tables.

Vertices in DAG 130 generally include parameters of queries to which they correspond, such as column names and types. Edges in DAG 130 generally include information characterizing the relationships between vertices, such as indicating that a given table was generated by selecting certain subsets of one or more existing tables. In some embodiments, DAG 130 includes a head vertex that serves as a root node, and to which all vertices that otherwise have no parent are connected.

Data store 110 generally represents a data storage entity that includes database 112 and documentation 114. Database 112 includes one or more tables comprising data related to a software application, such as application data and user data. Information is stored in and retrieved from database 112 via queries. Queries may, for instance, be submitted on behalf of users by the software application to a database server. Documentation 114 may include metadata of database 112, such as column names, types, descriptions, naming conventions, and the like relating to columns of the tables in database 114. For instance, documentation 114 may have been generated by a database administrator and/or other types of professionals.

DAG 130 may be used to produce propagated documentation 104 based on database 112 and documentation 114. Propagated documentation 104 generally represents documentation for given tables of database 112 that are derivative of other tables in database 112 that are propagated to the given tables from the other tables. In some cases, propagated documentation 104 comprises documentation that is copied directly from documentation 114 based on DAG 130, such as when DAG 130 indicates that a given table includes columns copied directly from other tables. In some embodiments, propagated documentation 104 includes documentation provided by a user, such as an administrator, in response to a notification generated based on DAG 130. In some embodiments, propagated documentation 104 is stored in data store 110 as part of documentation 114.

In an example, the software application traverses DAG 130 via a breadth-first search and identifies all vertices that lack documentation for at least some columns of the tables represented by the vertices. In alternative embodiments, a depth-first search is used.

If a vertex lacks documentation and one or more edges connected to the vertex indicate that the table represented by the vertex was created based on one or more other tables represented by other vertices, then the software application may determine whether the other vertices have documentation that can be propagated to the vertex. If such documentation exists, then it is automatically propagated to the vertex. If the relationship between the other vertices and the vertex is indirect, such as if the table represented by the vertex was created based on only subsets of columns of the other tables represented by the other vertices, then the software application generates a notification that documentation is needed for the vertex. A relationship between a first table and a second table is direct if one or more columns were copied in their entirety from the first table to the second table. Otherwise, the relationship is indirect. If the relationship is direct, such as if entire columns were copied from the other tables to the table, then the software application may propagate any documentation associated with the entire columns from the other vertices to the vertex. If documentation is missing from the other vertices, then the process may continue with the parents of the other vertices. Any vertices that are determined to be missing documentation may result in notifications being generated by the software application. A notification may indicate that documentation is needed for particular tables and/or columns, and may be displayed via a user interface associated with the software application. A user, such as a database administrator, may receive the notification and provide the missing documentation. In some embodiments, propagated documentation 104 is stored in data store 110 as metadata for database 112 along with documentation 114.

Example Directed Acyclic Graph for Database Documentation Propagation

Figure 2:
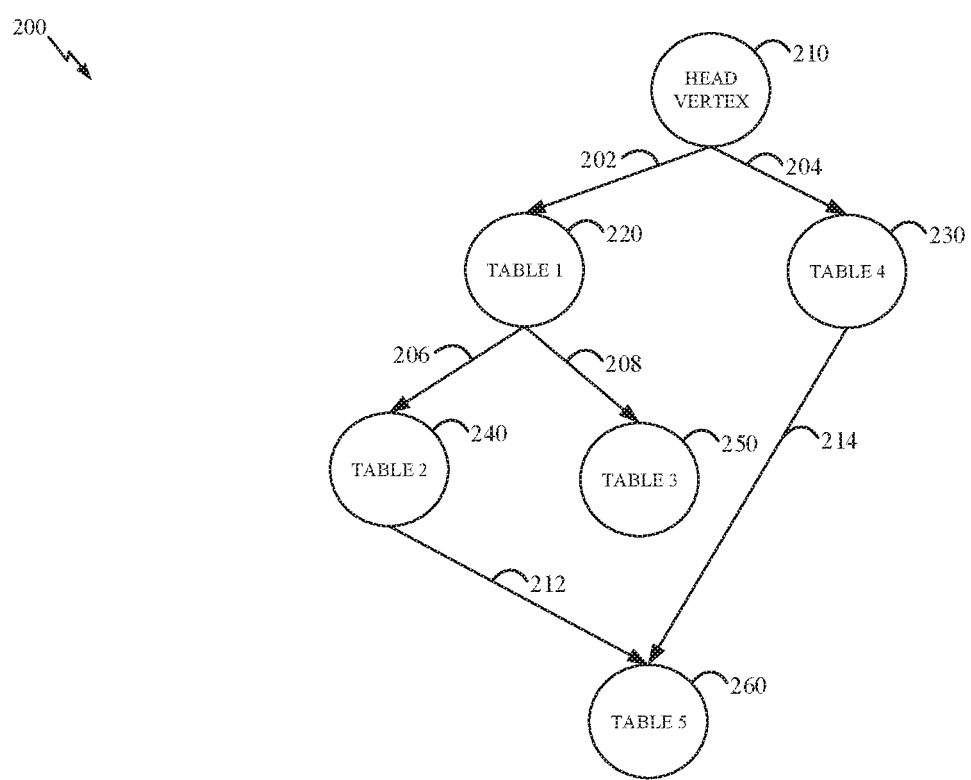
FIG. 2 depicts an example directed acyclic graph (DAG) for database documentation propagation.

FIG. 2 depicts an example DAG 200 for database documentation propagation. DAG 200 includes vertices 220 and 230, which are generated based on queries in a database query log that create or load tables without reference to any existing tables. Vertex 220 represents "TABLE 1" and vertex 230 represents "TABLE 4". Vertices 220 and 230 are connected via edges 202 and 204 to head vertex 210, which serves as a root of DAG 200.

Vertices 240 and 250 are generated based on queries that create tables with reference to existing tables. In particular, vertex 240 represents "TABLE 2", which was created based on "TABLE 1" and vertex 250 represents "TABLE 3", which was created based on "TABLE 1". In one example, entire columns of "TABLE 1" were copied to "TABLE 2" and/or "TABLE 3", while in other examples, "TABLE 2" and "TABLE 3" are created by selecting or filtering certain values from "TABLE 1" and/or performing additional operations on the one or more values (e.g., calculations involving values from "TABLE 1"). Edges 206 and 208 indicate that "TABLE 1" is an input to "TABLE 2" and "TABLE 3", and indicates the nature of the relationships between these connected tables. For instance, edge 206 may be associated with information identifying that "TABLE 2" was created by copying a column from "TABLE 1" in a query.

Vertex 260 is generated based on a query that creates "TABLE 5" based on "TABLE 2" and "TABLE 4". For example, "TABLE 5" may have been created by copying one column from "TABLE 2" and another column from "TABLE 4". Edges 212 and 214 indicate that vertices 240 and 230 are inputs to vertex 260, and specify the nature of the relationships between these vertices. For example, edge 212 may indicate which column of "TABLE 2" was copied into "TABLE 5".

As described in more detail below with respect to FIG. 3, DAG 200 is used to propagate documentation across tables of a database, such as by performing a breadth-first search of DAG 200 to determine relationships between tables and, propagate documentation across the tables accordingly.

Figure 3:
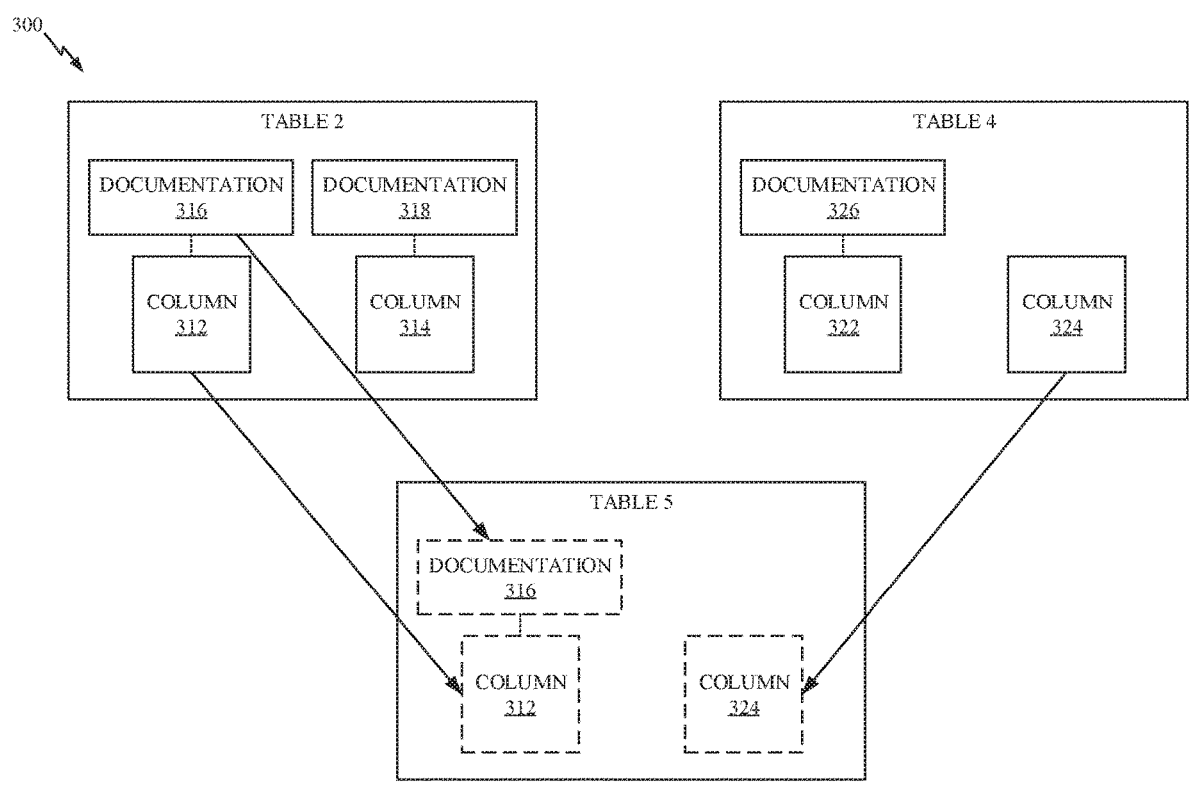
FIG. 3 depicts an example of propagating database documentation.

FIG. 3 depicts an example 300 of propagating database documentation. Table 2 corresponds to "TABLE 2" represented by vertex 240 of FIG. 2, table 4 corresponds to "TABLE 4" represented by vertex 230 of FIG. 2, and table 5 corresponds to "TABLE 5" represented by vertex 260 of FIG. 2.

Table 2 includes column 312, which is associated with documentation 316, and column 314, which is associated with documentation 318. Table 4 includes column 322, which is associated with documentation 326, and column 324, which is not associated with any documentation. Table 5 has been created based on tables 2 and 4 by copying column 312 from table 2 and column 324 from table 4.

A breadth-first search of DAG 200 of FIG. 2 may reveal that table 4 lacks documentation for column 324 and table 5 lacks documentation for column 312 (e.g., before documentation 316 has been propagated) and column 324. Because edge 212 of FIG. 2 indicates that column 312 was copied from table 2 to table 5, the software application copies documentation 316 from table 2 to table 5.

In alternative embodiments, edge 212 of FIG. 2 indicates that column 312 was not directly copied to table 5, such as if only a portion of column 312 is copied or if values from column 312 are used as part of calculations to generate table 5, and a notification is generated indicating that documentation is needed.

Edge 214 of FIG. 2 indicates that the creation of table 5 involved copying column 324 from table 4 to table 5. However, column 324 does not have any documentation in table 4. As such, there is no documentation to propagate to table 5. The software application may generate a notification indicating that documentation is needed for column 324 for both table 4 and table 5. Notifications are described in more detail with respect to FIG. 4 below.

Example User Interface Related to Database Documentation Propagation

Figure 4:
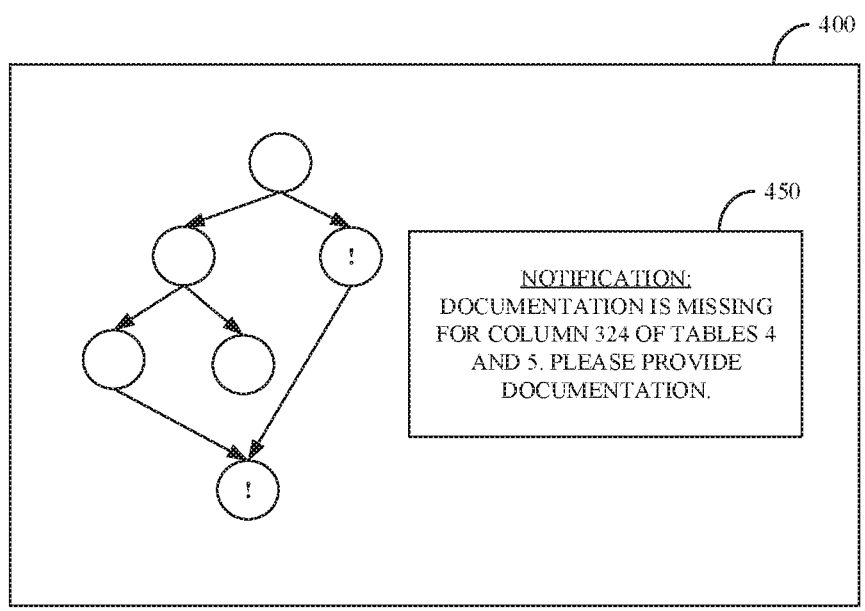
FIG. 4 depicts an example user interface related to database documentation propagation.

FIG. 4 depicts an example user interface 400 related to database documentation propagation. In some embodiments, user interface 400 corresponds to a software application associated with a database, such as database 112 of FIG. 1. User interface 400 displays a DAG, such as DAG 200 of FIG. 2, with alerts (e.g., shown as "!") depicted at vertices for which documentation is needed (e.g. for a table associated with the vertices).

User interface 400 also includes notification 450, which indicates that "documentation is missing for column 324 of tables 4 and 5," and that a user should "please provide documentation." In some embodiments, user interface 400 allows the user to provide the requested documentation, such as by clicking on notification 450 and entering or uploading the requested documentation.

Example Operations for Database Documentation Propagation

Figure 5:
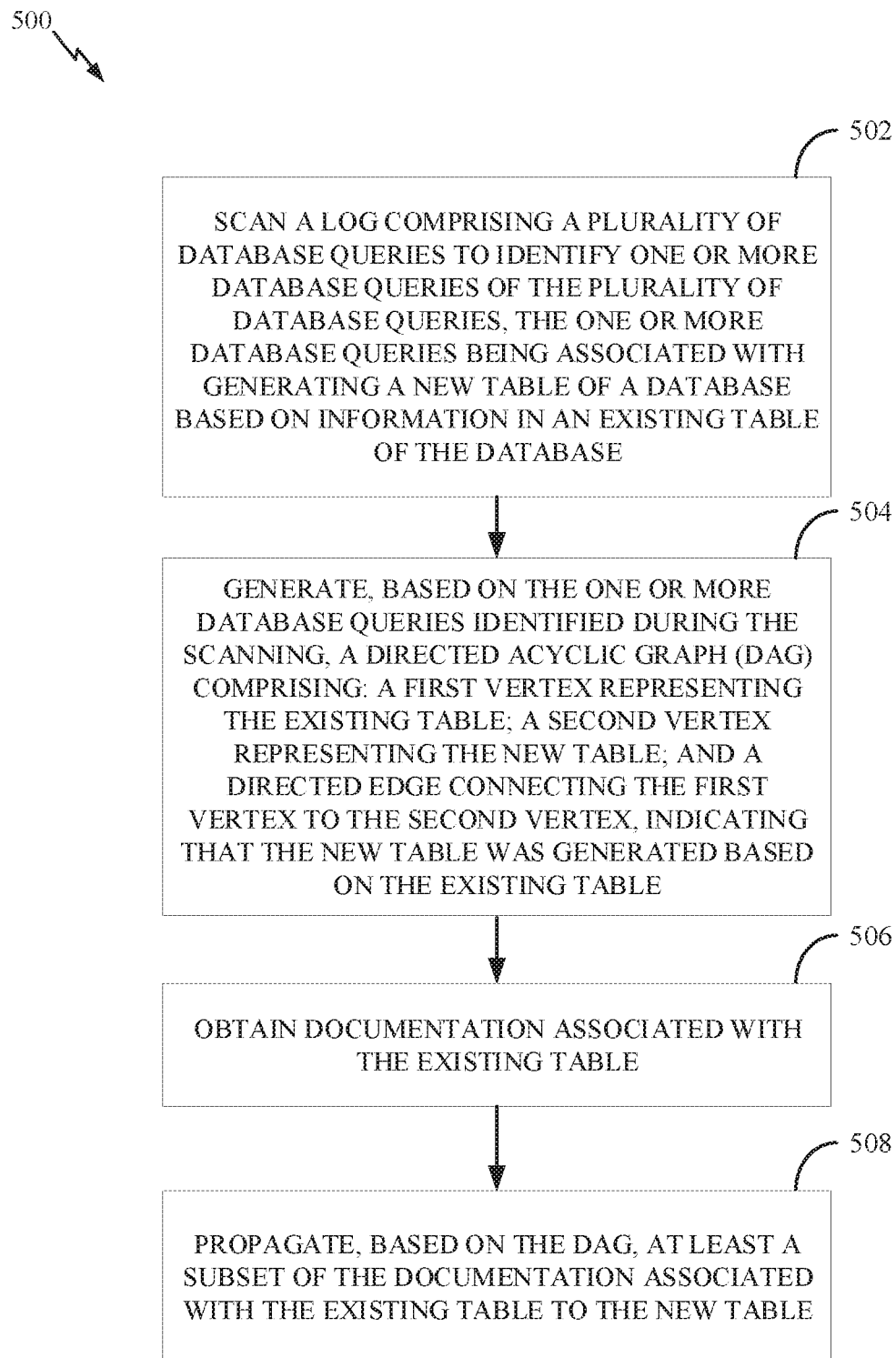
FIG. 5 depicts example operations for database documentation propagation based on query logs.

FIG. 5 depicts example operations 500 for database documentation propagation based on query logs. For example, operations 500 may be performed by application 614 of FIG. 6, as described below.

At step 502, a log comprising a plurality of database queries is scanned to identify one or more database queries of the plurality of database queries, the one or more database queries being associated with generating a new table of a database based on information in an existing table of the database. For instance, application 614 of FIG. 6 may scan database query log 120 of FIG. 1 to identify a query that involves generating table 330 of FIG. 3 based on table 310 and/or table 320 of FIG. 3.

At step 504, a directed acyclic graph (DAG) is generated based on one or more database queries identified during the scanning, the DAG comprising a first vertex representing the existing table, a second vertex representing the new table, and a directed edge connecting the first vertex to the second vertex, indicating that the new table was created based on the existing table. In an embodiment, application 614 of FIG. 6 generates DAG 200 of FIG. 2. The edge may indicate, for instance, that the new table was generated by copying a particular column from the existing table. In some embodiments, the plurality of database queries in the log are sorted according to execution time, and the DAG is generated based on the sorting. For example, the sorted database queries may be processed linearly (e.g., as sorted) to generate vertices and edges in the DAG.

At step 506, documentation associated with the existing table is obtained. For instance, documentation 316 of FIG. 3 may be obtained by application 614 of FIG. 6. In some embodiments, the documentation is metadata associated with the existing table.

At step 508, at least a subset of the documentation associated with the existing table is propagated to the new table. For instance, application 614 of FIG. 6 may propagate documentation 316 of FIG. 3 to table 330 of FIG. 3. In certain examples, in order to propagate the documentation, the DAG is traversed in a breadth-first search (BFS) in order to identify vertices that are missing documentation and identify documentation that can be propagated to these vertices. In some embodiments, propagating documentation involves copying metadata from the existing table to the new table.

In some embodiments, propagating, based on the DAG, the subset of the documentation associated with the existing table to the new table includes determining, based on the BFS, that a relationship between a column of the existing table and a corresponding column the new table is direct (e.g., that the column was copied directly to the new table), determining that the subset of the documentation is associated with the column of the existing table, and associating the subset of the documentation with the corresponding column of the new table.

In certain embodiments, propagating, based on the DAG, the subset of the documentation associated with the existing table to the new table further comprises determining, based on the BFS, that a relationship between a column of the existing table and a corresponding column the new table is direct, determining that there is no documentation associated with the column of the existing table, and generating a notification that there is no documentation associated with the column of the existing table, wherein the subset of the documentation is received in response to the notification and associated with the column of the existing table and the corresponding column of the new table.

In some embodiments, propagating, based on the DAG, the subset of the documentation associated with the existing table to the new table further includes determining, based on the BFS, that a relationship between a column of the existing table and a corresponding column the new table is indirect, and generating a notification that the subset of the documentation is needed, wherein the subset of the documentation is received in response to the notification and associated with the corresponding column of the new table. A relationship may be indirect if it involves only a subset of a column or if it involves performing one or more operations, such as calculations, based on values in the existing table.

Example Computing System for Determining Intent Using Weighted WMD

Figure 6:
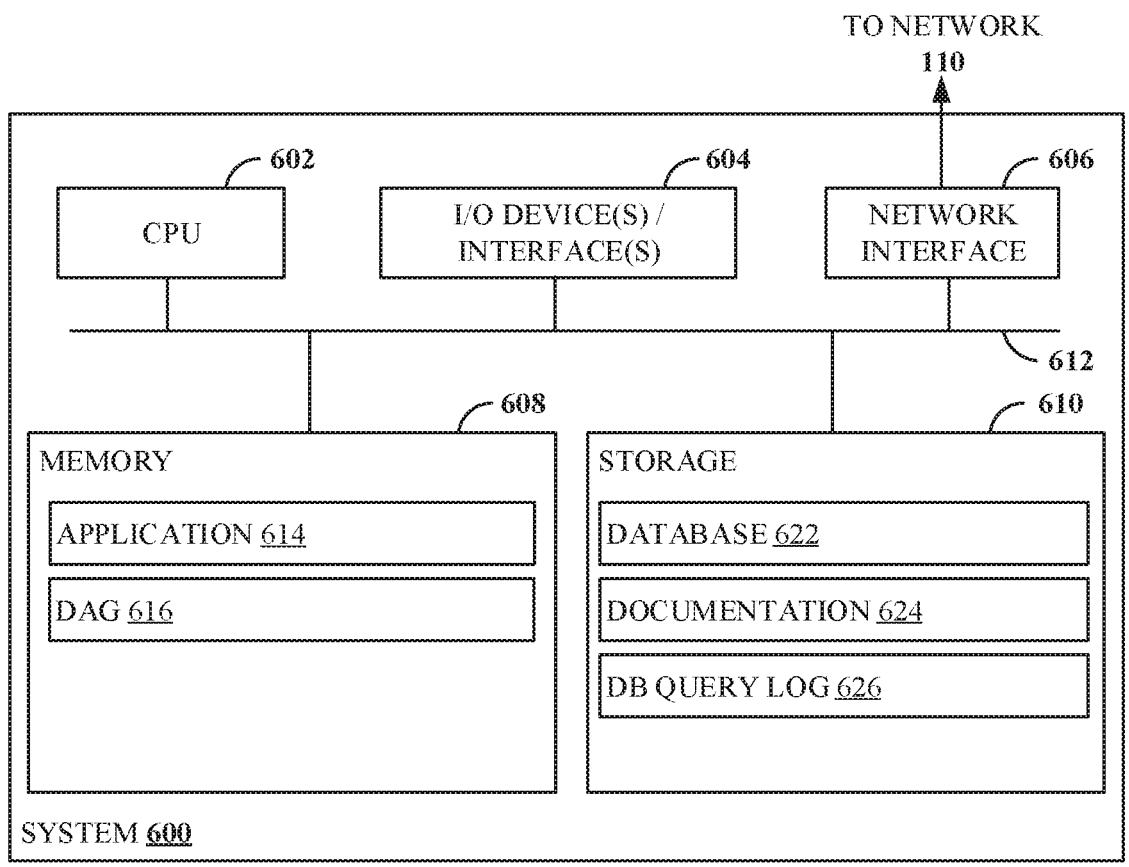
FIG. 6 depicts an example processing system for database documentation propagation based on query logs.

FIG. 6 illustrates an example system 600 with which embodiments of the present disclosure may be implemented. For example, system 600 may perform operations 500 of FIG. 5.

System 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, storage 610, and an interconnect 612. It is contemplated that one or more components of system 600 may be located remotely and accessed via a network. It is further contemplated that one or more components of system 600 may comprise physical components or virtualized components.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and other arrangements.

Additionally, the memory 608 is included to be representative of a random access memory. As shown, memory 608 includes application 614, which may be representative of application 150 of FIG. 1. For example, application 614 may propagate documentation across tables of a database using a DAG generated based on a query log. Memory 608 further includes DAG 616, which may be representative of DAG 200 of FIG. 2, and may be generated and used by application 614 for database documentation propagation.

Storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

Storage 610 comprises database 622, documentation 624, and database query log 626, which are generally representative of database 112, documentation, 114, and database query log 120 of FIG. 1. While database 622, documentation 624, and database query log 626 are depicted in local storage of system 600, it is noted database 622, documentation 624, and/or database query log 626 may also be located remotely (e.g., at a location accessible over a network, such as the Internet).

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:
    scanning a log comprising a plurality of database queries to identify one or more database queries of the plurality of database queries, the one or more database queries being associated with generating a new table of a database based on one or more columns of an existing table of the database;
    generating, based on the one or more database queries identified during the scanning, a directed acyclic graph (DAG) comprising:
        a first vertex representing the existing table;
        a second vertex representing the new table; and
        a directed edge connecting the first vertex to the second vertex and indicating that the new table was generated based on the one or more columns of the existing table;
    determining, based on the directed edge of the DAG, that a first column of the one or more columns of the existing table was copied to create a second column of the new table; and
    propagating, based on the directed edge of the DAG, documentation associated with the first column of the existing table to the second column of the new table by storing the documentation as metadata associated with the second column of the new table.

2. The computer-implemented method of claim 1, further comprising sorting the plurality of database queries in the log according to execution time to produce a sorted plurality of database queries, wherein the one or more database queries are identified in an order that corresponds to the sorted plurality of database queries, and wherein the one or more database queries are used in the order to generate the DAG.

3. The computer-implemented method of claim 1, further comprising traversing the DAG in a breadth-first search (BFS) in order to determine relationships between tables represented in the DAG.

4. The computer-implemented method of claim 3, wherein propagating, based on the DAG, the documentation associated with first column of the existing table to the second column of the new table further comprises determining, based on the BFS, that a relationship between the first column of the existing table and the second column of the new table is direct.

5. The computer-implemented method of claim 3, further comprising:
    determining, based on the BFS, that a relationship between a third column of the existing table and a fourth column of the new table is direct;
    determining that there is no documentation associated with the third column of the existing table;
    generating a notification that there is no documentation associated with the third column of the existing table; and
    receiving corresponding documentation associated with the third column of the existing table and the fourth column of the new table after generating the notification.

6. The computer-implemented method of claim 5, wherein the notification comprises a request for the corresponding documentation.

7. The computer-implemented method of claim 3, further comprising:
    determining, based on the BFS, that a relationship between a given column of the existing table and a corresponding column of the new table is indirect;
    generating a notification that respective documentation is needed for the corresponding column of the new table; and
    receiving the respective documentation associated with the corresponding column of the new table after generating the notification.

8. The computer-implemented method of claim 1, further comprising identifying the documentation associated with the first column of the existing table based on accessing respective metadata associated with the existing table.

9. A computer-implemented method, comprising:
    scanning, by a computing device, a log comprising a plurality of database queries to identify a subset of the plurality of database queries, wherein each respective database query in the subset is one of:
    a create table query;
    a load table query;
    an insert query; or
    an update table query;
    identifying, by the computing device, a database query in the subset, the database query being associated with generating a new table of a database based on one or more columns of an existing table of the database;
    generating, by the computing device, based on the database query, a directed acyclic graph (DAG) comprising:
        a first vertex representing the existing table;
        a second vertex representing the new table; and a directed edge connecting the first vertex to the second vertex, indicating that the new table was generated based on the one or more columns of the existing table;

traversing, by the computing device, the DAG to identify a relationship between the new table and the existing table based on the directed edge;

determining, by the computing device, that the relationship involves copying an entirety of a first column of the one or more columns of the existing table to create a second column of the new table; and propagating, by the computing device, documentation associated with the first column of the existing table to the second column of the new table by adding the documentation as metadata associated with the second column of the new table.

10. The computer-implemented method of claim 9, further comprising sorting the plurality of database queries in the log according to execution time to produce a sorted plurality of database queries.

11. The computer-implemented method of claim 9, wherein traversing the DAG comprises performing a breadth-first search (BFS).

12. The computer-implemented method of claim 9, wherein the documentation comprises one or more of:
   a column name;
   a type;
   a description; or
   a naming convention.

13. A system, comprising one or more processors and a non-transitory computer-readable medium comprising instructions that, when executed by the one or more processors, cause the system to perform a method, the method comprising:
   scanning a log comprising a plurality of database queries to identify one or more database queries of the plurality of database queries, the one or more database queries being associated with generating a new table of a database based on one or more columns of an existing table of the database;
   generating, based on the one or more database queries identified during the scanning, a directed acyclic graph (DAG) comprising:
      a first vertex representing the existing table;
      a second vertex representing the new table; and
      a directed edge connecting the first vertex to the second vertex and indicating that the new table was generated based on the one or more columns of the existing table;
   determining, based on the directed edge of the DAG, that a first column of the one or more columns of the existing table was copied to create a second column of the new table; and
   propagating, based on the directed edge of the DAG, documentation associated with the first column of the existing table to the second column of the new table by storing the documentation as metadata associated with the second column of the new table.

14. The system of claim 13, wherein the method further comprises sorting the plurality of database queries in the log according to execution time to produce a sorted plurality of database queries, wherein the one or more database queries are identified in an order that corresponds to the sorted plurality of database queries, and wherein the one or more database queries are used in the order to generate the DAG.

15. The system of claim 13, wherein the method further comprises traversing the DAG in a breadth-first search (BFS) in order to determine relationships between tables represented in the DAG.

16. The system of claim 15, wherein propagating, based on the DAG, the documentation associated with first column of the existing table to the second column of the new table further comprises determining, based on the BFS, that a relationship between the first column of the existing table and the second column of the new table is direct.

17. The system of claim 15, wherein the method further comprises:
   determining, based on the BFS, that a relationship between a third column of the existing table and a fourth column of the new table is direct;
   determining that there is no documentation associated with the third column of the existing table;
   generating a notification that there is no documentation associated with the third column of the existing table; and
   receiving corresponding documentation associated with the third column of the existing table and the fourth column of the new table after generating the notification.

18. The system of claim 17, wherein the notification comprises a request for the corresponding documentation.

19. The system of claim 15, wherein propagating, wherein the method further comprises:
   determining, based on the BFS, that a relationship between a given column of the existing table and a corresponding column of the new table is indirect;
   generating a notification that respective documentation is needed for the corresponding column of the new table; and
   receiving the respective documentation associated with the corresponding column of the new table after generating the notification.

20. The system of claim 13, wherein the method further comprises identifying the documentation associated with the first column of the existing table based on accessing respective metadata associated with the existing table.

* * * * *